SAMUEL GARDINER, Jr.
Improvement in Distributing Electricity for Gas Lighting and for other Purposes.

No. 125,387.  Patented April 9, 1872.

Witnesses:
Edw. W. Donn
H. O. Townsend

Inventor:
Saml. Gardiner Jr.

125,387

UNITED STATES PATENT OFFICE.

SAMUEL GARDINER, JR., OF NEW YORK, N. Y.

IMPROVEMENT IN DISTRIBUTING ELECTRICITY FOR GAS LIGHTING AND FOR OTHER PURPOSES.

Specification forming part of Letters Patent No. 125,387, dated April 9, 1872.

SPECIFICATION.

Specification describing certain Improvements in Electrical Apparatus as applied to public places and dwellings of a city, invented by SAMUEL GARDINER, Jr., of New York city, in the State of New York.

My invention relates chiefly to the lighting of gas in the dwellings and public places of a city, the electricity being supplied by a main wire running through the streets connected with a battery at some convenient point. The second part of my invention relates to a device for resisting a surplus amount of electricity that may be conveyed by the lateral wires to the places being supplied.

I propose using my several improvements in electrical gas-lighting apparatus for lighting gas-jets, as well as to operate any simple machinery used in a dwelling or public house; and to this end I would establish a battery of a proper power at some convenient point in a city, and from this point I propose running main wires through the streets, having them either suspended like telegraph-wires or run in subterranean tubes. To these main wires I propose to attach laterals or branch wires to run in stores, public houses, and dwellings to convey electricity to these places just as gas and water are supplied to families and business places. In order to have an amount of electricity sufficient to supply a large city, I shall have to employ a large amount of battery power; and in order that the supply furnished to any one place be not too great, I find it necessary to employ a means of disposing of the surplus over that actually sufficient for the one placed. For this purpose I have devised what I call a resisting-coil. This resister is formed of a series of wire coils wound about a cylinder formed of some non-conducting material. The wire is wrapped with silk or other substance, fibrous or textile, that may be a poor conductor of electricity, like the coils used in an electro-magnet. I propose to use as many of these resisters as will be necessary to suit each particular case. The wire, coming into the house from the main wire, I connect with one of the resisters, which must be placed somewhere between the main and the electric switch. If upon experiment I find that one of these resisting-coils is insufficient to resist the battery-power, I add another; if the two are insufficient, I add another, and so on until I get just enough battery-power to suit the particular case. From these resisters I carry the wire to the magnetic switch, which has wires branching to the gas-jets, or other places about the house. From the jars forming the battery I run a wire, which I connect with the gas-pipe in the street, at some convenient point, to form the negative pole of the battery.

In Figure 1 of my drawing I have shown the application of my invention to three houses. In the first there are four resisters, in the second five, and in the third six; but, as before stated, the number required can only be determined by actual experiment. The cylinders on which the resisters are formed may be of any convenient size. The heads of the resisters are formed of hard rubber or other non-conducting substance. The resisters may be united by twisting the wires together, or by any other means that will give a perfect conducting union. Mechanism for lighting gas by electricity, it is well known, as applied to public buildings, has been highly successful and advantageous, as it is quick and easy of operation; and where many burners have to be lighted simultaneously, decidedly economical and almost indispensable. In private dwellings and stores electricity has been used in turning on and off and lighting gas with a good deal of success, although with less proportionate economy, inasmuch as a large part of the expense has been applied to the apparatus forming the battery. The invention herein described has for its object, principally, to do away with the necessity of forming a battery for each place or house to which electricity is to be applied. The advantages to be derived from the use of a general local battery placed at some convenient point cannot be overestimated. In the first place, where special batteries are located in each house, considerable room and arrangement are required; also, the attention of a person skilled in the use of electricity is needed to keep the battery in good condition. These items give rise to considerable expense and inconvenience. Then again, it is sometimes the case that a family would wish to use electricity for a certain purpose to the exclusion of all others and could not afford the expense of a battery and its appurtenances, as, for instance, in medical treatment or furnishing power occasionally to run simple machinery, &c. The expense of electricity to a single establishment would be trifling when a whole city was supplied with electricity from a general local battery owned by a company. The advantages of the system I have devised and herein described cannot be too highly estimated when we consider the many uses to which electricity is now being applied and its daily growth in importance and application.

Figure 1:
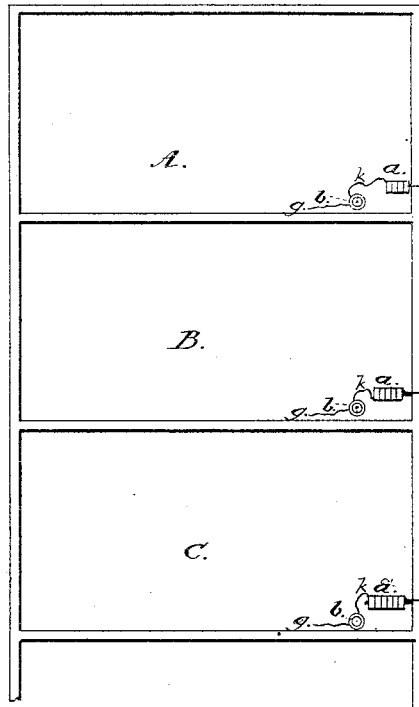
Figure 1 is a plan of three houses, showing the application of the invention.
Figure 3:
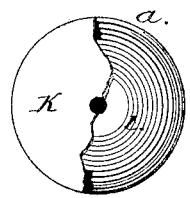
Fig. 3 is an end view of one of the resisters, one-half of head being broken away.
Figure 2:
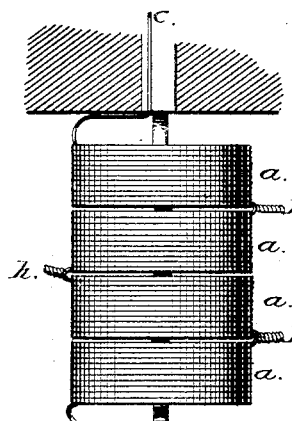
Fig. 2 is a detail showing several resisters and their relation to the switch and the lateral wire.
Figure 2:
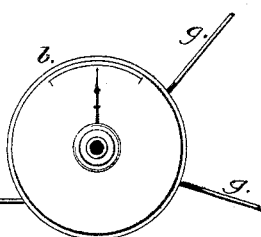

Letters of reference correspond in all the figures of the drawing.

A B C are plans of three houses. D is the main wire running through the street connected with the battery formed of the jars E E. *c c c* are lateral wires running into the houses having connected with them the resisters *a a a*. *b b b* are magnetic switches, such as are used to turn on and light gas by electricity. *k k k* are the wires connecting the switches with the resisters. *g g g* are wires to convey the electricity to the gas-burners and stop-cocks. *f* is a wire leading from the main battery to the gas-pipe at some convenient point. *h h h* show the manner of connecting together the several resisters. *i* is a rod attached to the wall to support the resisters. *l* is the cylinder forming the core of the resisters. *k* is the hard rubber-head to separate the resisters when more than one is used. Although the arrangement thus described is intended principally for operating gas-cocks and lighting gas-jets, I claim to use the same for many other purposes, such as turning on and off water, ringing bells, operating sewing-machines, and, in short, operating any simple mechanism that may require no more power than can be obtained in an electrical current.

Claims.

My claims are as follows:

1. The manner of supplying to a city electricity conducted through main wires having laterals running into dwellings and other places, as and for the purpose set forth.

2. The resisters *a a a*, located and arranged as shown and described, for the purpose set forth.

3. A general local battery, for supplying electricity through main and lateral wires, for various purposes, as set forth.

SAML. GARDINER, JR.

Witnesses:
   EDW. W. DONN,
   A. C. TOWNSEND.